United States Patent [19]

Persson

[11] Patent Number: 4,756,444
[45] Date of Patent: Jul. 12, 1988

[54] LID FOR LARGE FOOD PREPARATION CONTAINERS

[75] Inventor: Göran Persson, Västra Frölunda, Sweden

[73] Assignee: Goran Persson Maskin AB, Sweden

[21] Appl. No.: 41,056

[22] Filed: Apr. 22, 1987

[51] Int. Cl.⁴ .............................................. B65D 43/26
[52] U.S. Cl. ..................................... 220/329; 220/264
[58] Field of Search ..................... 220/329, 264, 336; 126/334

[56] References Cited

U.S. PATENT DOCUMENTS 1,436,606 11/1922 Ritter .
4,526,288 7/1985 Schuld ................................. 220/329

Primary Examiner—George T. Hall
Attorney, Agent, or Firm—Ostrolenk, Faber, Gerb & Soffen

[57] ABSTRACT

Lid for large containers (12) especially food preparation containers for catering, and of the type, supported by an arm (17), which is rotable around an axle (16). In order to admit the opening of a small slit of the container (12) opening under simultaneous swinging away of the lid (11), the axle (16) is therefore arranged at an acute angle against opening plane of the container (12).

4 Claims, 2 Drawing Sheets

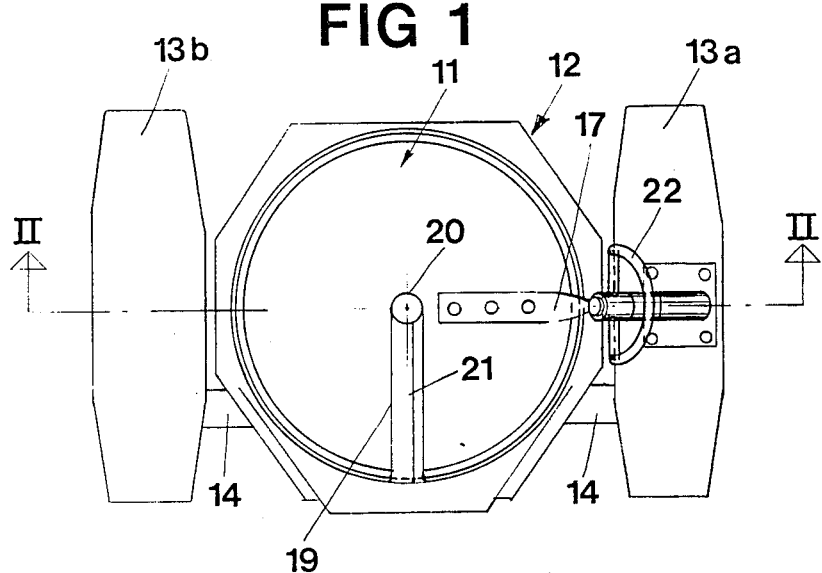
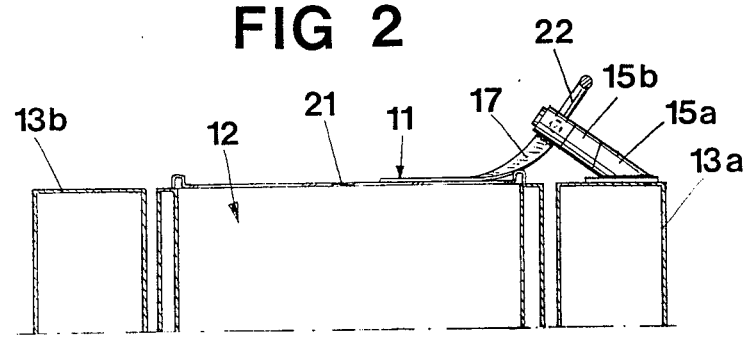
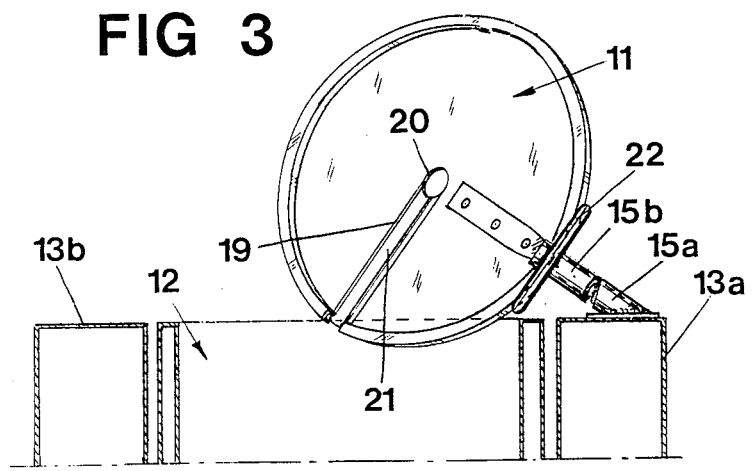

LID FOR LARGE FOOD PREPARATION CONTAINERS

The present invention relates to a lid for containers, especially food preparation containers for catering, and of the type supported by an arm, which is rotatable around an axle.

BACKGROUND OF THE INVENTION

Preparation of catering food is effected in large preparation containers containing volymes from 30 to 400 liters. These containers have a heavy lid covering the opening of the container, which lid is supported by an arm rotatable around a horizontal axle. When stirring, adding ingredients, and spices taking samples the entire lid must be open, which is a complicated procedure, which means heat losses and therefore increased heating costs.

MOST ESSENTIAL FEATURES OF THE INVENTION

The purpose of the present invention is to provide a lid which is easy to handle and allows opening of a small slit of the container opening under simultaneous moving away the lid. The adding of ingredients and sampeling should therefore be done without opening the entire lid. This has been solved in that the pivot axle of the lid is arranged at an acute angle against the opening plane of the container.

DESCRIPTION OF THE DRAWINGS

The invention will in hereinafter be futher descriped with reference to an embodiment shown in the enclosed drawings.

FIG. 1 shows a conventional food preparation container provided with a lid according to the invention in a view from above.

FIG. 2 shows a section elong line II—II in FIG. 1.

FIGS. 3 and 4 show corresponding section but with the lid in partly entirely opened positions respectively.

DESCRIPTION OF THE EMBODIMENT

Figure 4:
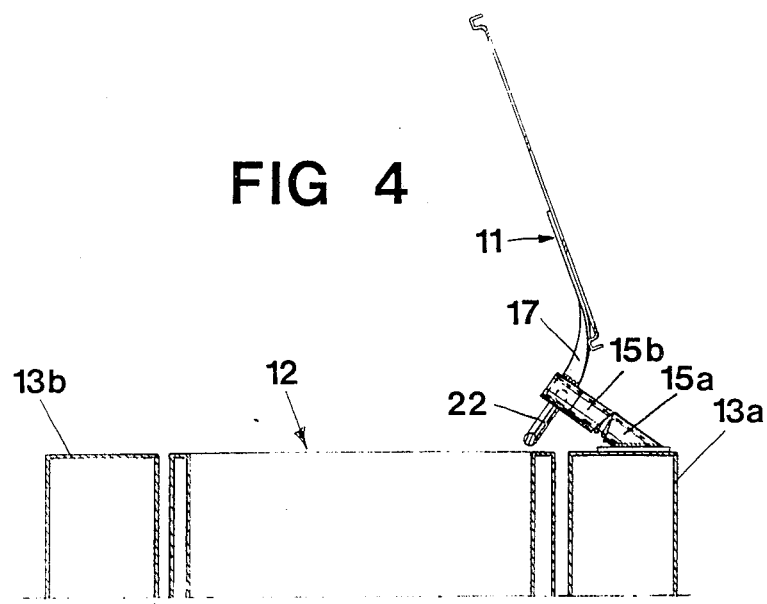
Figure 5:
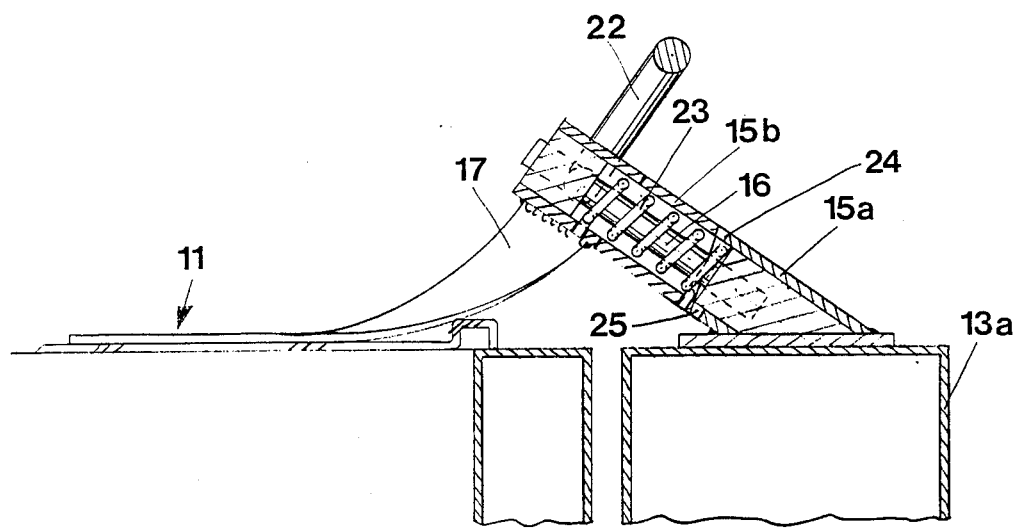
FIG. 5 shows in larger scale a section through the pivot axle of the lid.

The embodiment shown in the drawings uses a lid 11, according to the invention together with a conventional food preparation container 12, which is supported on support boxes 13 via a pivot axle 14. On one of the support boxes 13a is arranged a supporting sleeve for a arm, rotatable around the axle 16, which supports a stirring tool.

The lid 11, which preferably consists of a compression moulded disc of a transparent plastic material, has a slit 19, extending from the edge of lid 11 to its centre, where it terminates in a central opening 20, intended to recieve the above mentioned stirring tool. The slit 19 is covered by a lip seal 21, e.g. made of rubber.

The attachment 15 for the axle consists of a sleeve, which via a bevel cut dividing plane is diveded into two parts 15a and b pivotable relating to each other and one of which one, 15a being attached to the support box 13a and the other one 15b to the arm of the lid 11. A handle 22 for manoeuvering the lid 11 is further attached to the sleeve 15 as well as the axle 16 extending there through are arranged at an acute angle relative to the opening plane of the container.

When the lid is pivoted around the axle 16 it will at the same time be swung upwards and sidewards and uncover a gradually increasing part of the container 12 opening. A spring 23 compressed, between the sleeve parts 15a and b simplifies the opening of the lid 11. The sleeve parts 15a and b futhermore, are provided with mating recesses 24 and pegs 25 for locking the lid 11 in closed opened positions (180°) respectively. The slit 19 of the lid 11 is arranged to extend transversely to the plane which extends through the axle 16, whereby the slit 19 under the pivoting of an lid 11 is aligned with the direction of lids motion. The stirring tool inserted through the opening 20, needs therefore not to be removed before the lid 11 is opened, but can extend through the lip seal of the slit 19.

The invention is of course not limited to the embodiment shown but a number of modifications are possible within the scope of the following claims.

I claim:

1. Lid for a large container an arm for supporting the lid, the lid being rotatable around a pivot axle defined at and extend along the area the pivot axle is arranged at an acute angle against the opening plane of the container; the lid has a slit extending through the lid and transversely to the plane extending through the axle.

2. Lid according to claim 1, wherein that slit is covered by a lip sealing.

3. Lid according to claim 1, wherein the lid has an edge including a rear edge and has a center, and the slit extends from the rear edge of the lid as seen in the opening direction up, to its center where it terminates in an opening for reception of a stirring tool, of the like.

4. Lid according to claim 2, wherein the lid has an edge including a rear edge and has a center, and the slit extends from the rear edge of the lid as seen in the opening direction up, to its center where it terminates in an opening for reception of a stirring tool, or the like.

* * * * *